(12) United States Patent
Sasaki et al.

(10) Patent No.: US 6,813,495 B2
(45) Date of Patent: Nov. 2, 2004

(54) METHOD OF HAND-OVER PROCESSING

(75) Inventors: Teruo Sasaki, Shizuoka (JP); Satoshi Asaga, Kanagawa (JP)

(73) Assignees: NEC Corporation, Tokyo (JP); NTT DoCoMo, Inc., Tokyo (JP)

( * ) Notice: Subject to any disclaimer, the term of this patent is extended or adjusted under 35 U.S.C. 154(b) by 583 days.

(21) Appl. No.: 09/956,329

(22) Filed: Sep. 19, 2001

(65) Prior Publication Data

US 2002/0042273 A1 Apr. 11, 2002

(30) Foreign Application Priority Data

Sep. 20, 2000 (JP) ........................................ 2000-285528

(51) Int. Cl.$^7$ ................................................ H04Q 7/20
(52) U.S. Cl. ...................... 455/442; 455/437; 455/436; 370/331
(58) Field of Search ................................ 455/442, 437, 455/436, 422.1, 434, 438, 464, 512, 513, 517, 561, 560; 370/331, 332

(56) References Cited

U.S. PATENT DOCUMENTS 6,240,291 B1 * 5/2001 Narasimhan et al. ........ 455/436
6,532,221 B1 * 3/2003 Kim et al. ................... 370/332

FOREIGN PATENT DOCUMENTS

| GB | 2367201 A | 3/2002 |
|---|---|---|
| JP | 5-91038 | 4/1993 |
| JP | 9-322222 | 12/1997 |
| JP | 10-126830 | 5/1998 |
| JP | 10-191419 | 7/1998 |
| JP | 11-275623 | 10/1999 |
| JP | 2000-59297 | 2/2000 |
| JP | 2000-92541 | 3/2000 |
| JP | 2000-224646 | 8/2000 |

OTHER PUBLICATIONS

Copy of Japanese Office Action dated Sep. 3, 2003 (and Ehnglish translation of relevant portion).
Search Report dated Apr. 15, 2002.

\* cited by examiner

*Primary Examiner*—Melur Ramakrishnaiah
(74) *Attorney, Agent, or Firm*—Dickstein, Shapiro, Morin & Oshinsky, LLP.

(57) ABSTRACT

A method for hand-over processing is provided in which excellent speech quality is maintained and needless and wasteful hunting of a base station is not performed by coping properly with various conditions of radio waves in which a mobile terminal is put and power consumption is reduced.

The mobile terminal is measuring, at fixed intervals, a radio wave receiving level provided by the base station being presently operated for a telephone call. When a variation amount of the receiving level being a difference between a present receiving level and a receiving level measured last time is greater than a predetermined threshold value, the hand-over processing is performed and base station hunting processing to hunt a base station to which connection of the mobile terminal is to be handed over, is started. In the base station hunting processing, the hand-over selection level is used as the receiving level.

25 Claims, 9 Drawing Sheets

METHOD OF HAND-OVER PROCESSING

BACKGROUND OF THE INVENTION

1. Field of the Invention

The present invention relates to a method of hand-over processing in which a base station to be connected to a mobile terminal is switched when the mobile terminal moves from one service area covered by one base station to another service area covered by another base station.

The present application claims priority of Japanese Patent Application No.2000-285528 filed on Sep. 20, 2000, which is hereby incorporated by reference.

2. Description of the Related Art

In mobile communication systems such as a PHS (Personal Handy-phone System), hand-over processing is performed when a mobile terminal moves from a service area covered by one base station to another service area covered by another base station.

Conventional hand-over processing will be described by referring to FIG. 8. In FIG. 8, for example, when a mobile terminal 1 is located in a service area 4 covered by a base station 2, the mobile terminal 1 is carrying out communications with the base station 2 over a wireless communication line. If the mobile terminal 1 moves and enters a service area 5 covered by a base station 3, the mobile terminal 1 performs hand-over processing in which the base station 2 being presently connected to the mobile terminal 1 is switched to the base station 3 to which the mobile terminal 1 is to be connected next.

In the conventional hand-over processing method, communications with the mobile terminal 1 being presently operated for a telephone call are terminated on a temporary basis, in order to perform the hand-over processing to hunt another base station with which the mobile terminal 1 is newly communicated. This hand-over processing takes about 2 seconds to complete its processing, which arises a problem that communication is interrupted for about 2 seconds in the middle of the call.

To solve such the problem, hand-over processing is proposed in which high-speed hand-over processing is made possible by providing one mobile terminal with two radio wave receiving sections. In the proposed high-speed hand-over processing, when a base station is switched, while the telephone voice communication is being continued by using one of the two radio wave receiving sections, a base station to which connection of the mobile terminal is handed over is hunted by using another radio wave receiving section. When the base station to which the mobile terminal is to be connected is found, switching to the base station is done, thus obtaining an effect of shortening the time of voice interruption.

FIG. 9 is a schematic block diagram showing configurations of such the mobile terminal 1 that has two radio wave receiving sections. The mobile terminal 1 includes one radio wave receiving section made up of a wireless section 10, a synthesizer 11, and a decoder 12 and he other radio wave receiving section made up of a wireless section 20, a synthesizer 21, and a decoder 22. The mobile terminal 1 further includes a switching unit 40 used to switch data fed from the decoder 12 or decoder 22 and a switching control section 30 used to control the switching unit 40.

The switching control section 30 detects a receiving level of a radio wave that the wireless sections 10 and 20 are receiving and performs hand-over processing, as shown in a flowchart of FIG. 10, based on the receiving level.

Next, the conventional hand-over processing will be described by referring to FIG. 10.

The mobile terminal 1 is measuring, at fixed intervals, a receiving level of the radio wave transmitted from the base station being presently operated for the telephone voice communication with the mobile terminal 1. If a receiving level of a radio wave transmitted from a base station is sufficiently high, the mobile terminal 1 carries out communications with the communication line connected to the base station and performs processing of the telephone voice communication (Step 901). Here, the description will be made by assuming that the radio wave from the base station is received by the wireless section 10 and the synthesizer 11.

When the radio wave receiving level becomes lower than a fixed level (hereinafter, the fixed level being referred to as a "hand-over processing level"), the hand-over processing is started (Step 902). When the hand-over processing is started, base station hunting processing to hunt a base station to which connection of the mobile terminal 1 is to be handed over is performed the wireless section 20 and synthesizer 21 (Step 903). In the base station hunting processing, by selecting only base stations which can provide the receiving level being level than a fixed level "D" (hereinafter referred to as a "hand-over selection level"), candidates for a base station to which the connection of the mobile terminal 1 is to be handed over are determined. Then, when the base station to which the connection of the mobile terminal 1 is handed over is determined, the hand-over processing is performed by controlling the wireless section 20 so as to receive radio waves from the determined base station and by instructing the switching control section 30 to control the switching unit 40 so as to select data fed from the decoder 22 (Step 904).

In such the conventional hand-over processing method, though the time required for the hand-over processing can be shortened, it is necessary to set the hand-over processing level at a higher value, compared with cases of ordinary hand-over processing methods, in order to maintain excellent speech quality.

When the mobile terminal 1 moves to a region in which base stations exist sparsely, in some cases, the radio wave receiving level that the base station being presently operated for the telephone voice communication provides is below the hand-over processing level all the time. In such the case, in the conventional hand-over processing method, since the hand-over level and hand-over selection level are set as fixed values, the mobile terminal 1 always performs the base station hunting, thus causing an increase in power consumption and a shortened life of a battery.

Moreover, when a case of high speed movement of the mobile terminal 1 by a car or a like is compared with a case of low speed movement of the mobile terminal 1 on foot or a like, since a level of speech quality at which the user feels comfortable varies due to an effect of fading, the hand-over processing level which is set at the fixed values is different from the hand-over processing level that can provide an optimum speech quality.

Furthermore, when the hand-over selection level is set at the fixed value, since the hand-over selection level has to be set at a somewhat high level in order to ensure good communication quality, even if a base station is one to which the connection of the mobile terminal 1 is to be handed over, when the receiving level that the base station can provide does not reach the hand-over selection level, the base station cannot be selected as the base station to which the connection of the mobile terminal 1 is to be handed over.

As described above, the conventional hand-over processing method, since the hand-over selection level and hand-over processing level are set at the fixed value, cannot properly handle various conditions of radio waves in which the mobile terminal 1 is put, which causes degradation in speech quality and needless and wasteful hunting of the base station, and increases power consumption.

SUMMARY OF THE INVENTION

In view of the above, it is an object of the present invention to provide a method for hand-over processing in which excellent speech quality is maintained and needless and wasteful hunting of a base station is not performed by coping properly with various conditions of radio waves in which a mobile terminal is put, which can reduce power consumption.

According to a first aspect of the present invention, there is provided a hand-over processing method for performing hand-over processing in a mobile terminal capable of simultaneously receiving radio waves from two different base stations, the hand-over processing is to switch the base stations to which a line is connected for making a telephone voice communication, the method including:

a step of measuring, at fixed intervals, a receiving level provided by the base station being presently operated for the telephone voice communication;

a step of comparing a variation amount of a receiving level with a predetermined threshold value, the variation amount being indicative of a difference between a present receiving level and a receiving level measured last time provided by the base station being operated for the telephone voice communication;

a step of starting base station hunting processing to hunt a base station to which connection of the mobile terminal is to be handed over when the variation amount of the receiving level is judged to be greater than the threshold value;

a step of providing, in the base station hunting processing, a hand-over selection level by adding a predetermined value greater than 0 (zero) to the present receiving level; and a step of hunting, in the base station hunting processing, a base station whose receiving level is higher than the hand-over selection level as the base station to which connection of the mobile terminal is to be handed over.

With the above configuration, whether the hand-over processing is started or not is judged based on the variation amount of the radio wave receiving level provided by the base station being presently operated for the telephone voice communication and, therefore, even if the receiving level is high at the time of the high speed movement of the mobile terminal, the hand-over processing can be started easily, thus providing optimum voice quality. Moreover, the hand-over selection level can be variable depending on the receiving level provided by the base station being presently operated for the telephone voice communication and therefore it is possible to properly cope with various conditions of radio waves in which the mobile terminal is put and thus needless base station hunting can be prevented and an increase in power consumption can be avoided, and the hand-over processing is performed whenever the hand-over is necessary and therefore telephone voice communication quality can be improved. Furthermore, a difference in the receiving level between the receiving level provided by the base station being presently operated for the telephone voice communication and the hand-over selection level is set and therefore indiscriminate and random repetition of the hand-over processing can be prevented and needless hand-over processing can be avoided.

According to a second aspect of the present invention, there is provided a hand-over processing method for performing hand-over processing in a mobile terminal capable of simultaneously receiving radio waves from two different base stations, the hand-over processing is to switch the base stations to which a line is connected for making a telephone voice communication, the method including:

a step of comparing a receiving level with a predetermined value, the receiving level being provided by the base station being presently operated for the telephone voice communication;

a step of measuring, at fixed intervals, the receiving level provided by the base station being presently operated for the telephone voice communication;

a step of comparing, when a present receiving level provided by the base station being operated for the telephone voice communication is judged to be higher than a predetermined value, a variation amount of a receiving level with a predetermined first threshold value, the variation amount being indicative of a difference between the present receiving level and a receiving level measured last time;

a step of starting base station hunting processing to hunt a base station to which connection of the mobile terminal is to be handed over when the variation amount of the receiving level is judged to be greater than the predetermined first threshold value;

a step of comparing the variation amount of the receiving level with a second threshold value which is smaller than the predetermined first threshold value, when the receiving level provided by the base station being presently operated for the telephone voice communication is judged to be lower than the predetermined value;

a step of starting base station hunting processing to hunt a base station to which connection of the mobile terminal is handed over when the variation amount of the receiving level is greater than the second threshold value;

a step of providing, in the base station hunting processing, a hand-over selection lever by adding a predetermined value greater than 0 (zero) to the present receiving level; and a step of hunting, in the base station hunting processing, a base station whose receiving level is higher than the hand-over selection level as the base station to which connection of the mobile terminal is to be handed over.

With the above configuration, when the receiving level provided by the base station being presently operated for the telephone voice communication is higher than a predetermined level, by using, as the threshold value for the variation amount of the receiving level used to judge whether the hand-over processing is started or not, the predetermined first threshold value being a high value and, when the receiving level provided by the base station being presently operated for the telephone voice communication is lower than the predetermined level, by using, as the predetermined threshold value for the variation amount of the receiving level used to judge whether the hand-over processing is started or not, the second threshold value being lower than the first threshold value, the indiscriminate hand-over processing is not started when the receiving level provided by the base station being presently operated for the telephone voice communication is high and, therefore, needless base station hunting can be reduced without degradation of the radio wave receiving quality and, when the receiving level provided by the base station being presently operated for the telephone voice communication is low, the hand-over processing is easily started to avoid the degradation of the radio wave receiving quality.

According to a third aspect of the present invention, there is provided a hand-over processing method for performing hand-over processing in a mobile terminal capable of simultaneously receiving radio waves from two different base stations, the hand-over processing is to switch the base stations to which a line is connected for making a telephone voice communication, the method including:

a step of comparing a receiving level provided by the base station being presently operated for the telephone voice communication with a plurality of predetermined values;

a step of measuring, at fixed intervals, the receiving level provided by the base station being presently operated for the telephone voice communication;

a step of comparing a variation amount of a receiving level with a threshold value, the variation amount being indicative of a difference between a present receiving level and a receiving level measured last time provided by the base station being operated for the telephone voice communication and the threshold value is determined by comparison between the present receiving level provided by the base station being operated for the telephone voice communication and the plurality of predetermined values;

a step of starting base station hunting processing to hunt a base station to which connection of the mobile terminal is to be handed over when the variation amount of the receiving level is judged to be greater than the threshold value;

a step of providing, in the base station bunting processing, a hand-over selection level by adding a predetermined value greater than 0 (zero) to the present receiving level; and a step of hunting, in the base station hunting processing, a base station whose receiving level is higher than the hand-over selection level as the base station to which connection of the mobile terminal is to be handed over.

According to a fourth aspect of the present invention, there is provided a hand-over processing method for performing hand-over processing in a mobile terminal capable of simultaneously receiving radio waves from two different base stations, the hand-over processing is to switch the base stations to which a line is connected for making a telephone voice communication, the method including:

a step of measuring, at fixed intervals, a receiving level provided by the base station being presently operated for the telephone voice communication;

a step of comparing a variation amount of a receiving level with a predetermined first threshold value, the variation amount being indicative of a difference between a present receiving level and a receiving level measured last time provided by the base station being operated for the telephone voice communication;

a step of comparing the variation amount of the receiving level with a predetermined second threshold value when the variation amount of the receiving level is judged to be greater than the first threshold value;

a step of starting base station hunting processing to hunt a base station to which connection of the mobile terminal is handed over when the variation amount of the receiving level is judged to be greater than the predetermined second threshold value;

a step of providing, in the base station hunting processing, a hand-over selection level by adding a predetermined value greater than 0 (zero) to the present receiving level; and a step of hunting, in the base station hunting processing, a base station whose receiving level is higher than the hand-over selection level as the base station to which connection of the mobile terminal is to be handed over.

According to a fifth aspect of the present invention, there is provided a hand-over processing method for performing hand-over processing in a mobile terminal capable of simultaneously receiving radio waves from two different base stations, the hand-over processing is to switch the base stations to which a line is connected for making a telephone voice communication, the method including:

a step of measuring, at fixed intervals, a receiving level provided by the base station being presently operated for the telephone voice communication;

a step of comparing a variation amount of a receiving level with a plurality of predetermined threshold values, the variation amount being indicative of a difference between a present receiving level and a receiving level measured last time provided by the base station being operated for the telephone voice communication;

a step of starting base station hunting processing to hunt a base station to which connection of the mobile terminal is handed over when the variation amount of the receiving level is judged to be greater than all of the threshold values being subjected to the comparison;

a step of providing, in the base station hunting processing, a hand-over selection level by adding a predetermined value greater than 0 (zero) to the present receiving level; and a step of hunting, in the base station hunting processing, a base station whose receiving level is higher than the hand-over selection level as the base station to which connection of the mobile terminal is to be handed over.

According to a sixth aspect of the present invention, there is provided a hand-over processing method for performing hand-over processing in a mobile terminal capable of simultaneously receiving radio waves from two different base stations, the hand-over processing is to switch the base stations to which a line is connected for making a telephone voice communication, the method including:

a step of measuring, at fixed intervals, a receiving level provided by the base station being presently operated for the telephone voice communication;

a step of comparing a variation amount of a receiving level with a predetermined first threshold value, the variation amount being indicative of a difference between a present receiving level and a receiving level measured a predetermined number of times before the last provided by the base station being operated for the telephone voice communication;

a step of comparing the variation amount of the receiving level with a predetermined second threshold value when the variation amount of the receiving level is judged to be greater than the first threshold value;

a step of starting base station hunting processing to hunt a base station to which connection of the mobile terminal is handed over when the variation amount of the receiving level is judged to be greater than the predetermined second threshold value;

a step of providing, in the base station hunting processing, a hand-over selection level by adding a predetermined value greater than 0 (zero) to the present receiving level; and a step of hunting, in the base station hunting processing, a base station whose receiving level is higher than the hand-over selection level as the base station to which connection of the mobile terminal is to be handed over.

With the above configurations, the threshold value used in the comparison with the variation amount of the receiving level and the threshold value for the variation amount of the receiving level used to judge whether the hand-over processing is started are set an arbitrary number of times and the comparison processing can be combined and therefore finer setting is made possible.

According to a seventh aspect of the present invention, there is provided a hand-over processing method for performing hand-over processing in a mobile terminal capable of simultaneously receiving radio waves from two different base stations, the hand-over processing is to switch the base stations to which a line is connected for making a telephone voice communication, the method including:

a step of comparing a receiving level with a predetermined value, the receiving level being provided by the base station being presently operated for the telephone voice communication;

a step of measuring, at fixed intervals, the receiving level provided by the base station being presently operated for the telephone voice communication;

a step of comparing, when a present receiving level provided by the base station being operated for the telephone voice communication is Judged to be higher than a predetermined value, a variation amount of a receiving level with a predetermined first threshold value, the variation amount being indicative of a difference between the present receiving level and a receiving level measured last time;

a step of comparing the variation amount of the receiving level with a predetermined second threshold value when the variation amount of the receiving level is judged to be greater than the first threshold value;

a step of starting base station hunting processing to hunt a base station to which connection of the mobile terminal is handed over when the variation amount of the receiving level is judged to be greater than the predetermined second threshold value;

a step of comparing the variation amount of the receiving level with a third threshold value which is smaller than the predetermined first threshold value, when the receiving level provided by the base station being presently operated for the telephone voice communication is judged to be lower than the predetermined value;

a step of starting base station hunting processing to hunt a base station to which connection of the mobile terminal is handed over when the variation amount of the receiving level is greater than the third threshold value;

a step of providing, in the base station hunting processing, a hand-over selection level by adding a predetermined value greater than 0 (zero) to the present receiving level; and a step of hunting, in the base station hunting processing, a base station whose receiving level is higher than the hand-over selection level as the base station to which connection of the mobile terminal is to be handed over.

According to an eighth aspect of the present invention, there is provided a hand-over processing method for performing hand-over processing in a mobile terminal capable of simultaneously receiving radio waves from taco different base stations, the hand-over processing is to switch the base stations to which a line is connected for making a telephone voice communication, the method including:

a step of comparing a receiving level provided by the base station being presently operated for the telephone voice communication with a plurality of predetermined values;

a step of measuring, at fixed intervals, the receiving level provided by the base station being presently operated for the telephone voice communication;

a step of comparing a variation amount of a receiving level with one or a plurality of threshold values, the variation amount being indicative of a difference between a present receiving level and a receiving level measured last time provided by the base station being operated for the telephone voice communication and the threshold value is determined by comparison between the present receiving level provided by the base station being operated for the telephone voice communication and the plurality of predetermined values;

a step of starting base station hunting processing to hunt a base station to which connection of the mobile terminal is to be handed over when the variation amount of the receiving level is judged to be greater than the one or he plurality of threshold values;

a step of providing, in the base station hunting processing, a hand-over selection level by adding a predetermined value greater than 0 (zero) to the present receiving level; and a step of hunting, in the base station hunting processing, a base station whose receiving level is higher than the hand-over selection level as the base station to which connection of the mobile terminal is to be handed over.

According to a ninth aspect of the present invention, there is provided a A hand-over processing method for performing hand-over processing in a mobile terminal capable of simultaneously receiving radio waves from two different base stations, the hand-over processing is to switch the base stations to which a line is connected for making a telephone voice communication, the method including:

a step of measuring, at fixed intervals, a receiving level provided by the base station being presently operated for the telephone voice communication;

a step of comparing a variation amount of a receiving level with a predetermined first threshold value, the variation amount being indicative of a difference between a present receiving level and a receiving level measured last time provided by the base station being operated for the telephone voice communication;

a step of starting base station hunting processing to hunt a base station to which connection of he mobile terminal is handed over when the variation amount of the receiving level is judged to be greater than the predetermined first threshold value;

a step of comparing the variation amount of the receiving level with a predetermined second threshold value when the variation amount of the receiving level is judged to be lower than the first threshold value;

a step of comparing the variation amount of the receiving level with a predetermined third threshold value when the variation amount of the receiving level is judged to be lower than the second threshold value;

a step of starting base station hunting processing to hunt a base station to which connection of the mobile terminal is handed over when the variation amount of the receiving level is judged to be greater than the third threshold value;

a step of providing, In the base station hunting processing, a hand-over selection level by adding a predetermined value greater than 0 (zero) to the present receiving level; and a step of hunting, in the base station hunting processing, a base station whose receiving level is higher than the hand-over selection level as the base station to which connection of the mobile terminal is to be handed over.

According to a tenth aspect of the present invention, there is provided a hand-over processing method for performing hand-over processing in a mobile terminal capable of simultaneously receiving radio waves from two different base stations, the hand-over processing is to switch the base stations to which a line is connected for making a telephone voice communication, the method including:

a step of measuring, at fixed intervals, a receiving level provided by the base station being presently operated for the telephone voice communication;

a step of comparing a variation amount of a receiving level with a predetermined first threshold value, the variation amount being indicative of a difference between a present receiving level and a receiving level measured Last time provided by the base station being operated for the telephone voice communication;

a step of starting base station hunting processing to hunt a base station to which connection of the mobile terminal is handed over when the variation amount of the receiving level is judged to be greater than the predetermined first threshold value;

a step of comparing the variation amount of the receiving level with a predetermined plurality of second threshold values when the variation amount of the receiving level is judged to be lower than the first threshold value;

a step of starting base station hunting processing to hunt a base station to which connection of the mobile terminal is to be handed over when the variation amount of the receiving level is judged to be smaller than all of the plurality of second threshold values;

a step of providing, in the base station hunting processing, a hand-over selection level by adding a predetermined value greater than 0 (zero) to the present receiving level; and a step of hunting, in the base station hunting processing, a base station whose receiving level is higher than the hand-over selection level as the base station to which connection of the mobile terminal is to be handed over.

In the foregoing, a preferable mode is one that wherein includes a step of disabling the base station hunting when the present receiving level provided by the base station being operated for the telephone voice communication is higher than the predetermined level.

With the above configurations, since, whether the hand-over processing is started or not is judged depending on whether the amount of variations in the receiving level provided by the base station being presently operated for the telephone voice communication is large or not, the quality that can provide clear reception can be maintained in the case of both the high speed movement of the mobile terminal and the low speed movement of the mobile terminal. Moreover, since the hand-over processing level is made variable depending on the variation value based on the receiving level that the base station provides, the case can be avoided in which the hunting of the base station for the hand-over is always carried out in spite of the case in which the receiving level provided by the base station is, all the time, below the hand-over processing level in regions in which base stations exist sparsely, which prevents needless base station hunting processing, thus reducing power consumption. Also, the hand-over selection level is made changeable depending on the receiving level that the base station provides and therefore the base station hunting at the optimum level is made possible and the quality that can provide clear reception is ensured. Furthermore, when the receiving level provided by the base station being presently operated for the telephone voice communication is maintained at the high level, even if variations occur in the receiving level, since the hand-over processing Is not required, needless hand-over processing is not performed, also thus contributing to reduce the power consumption.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
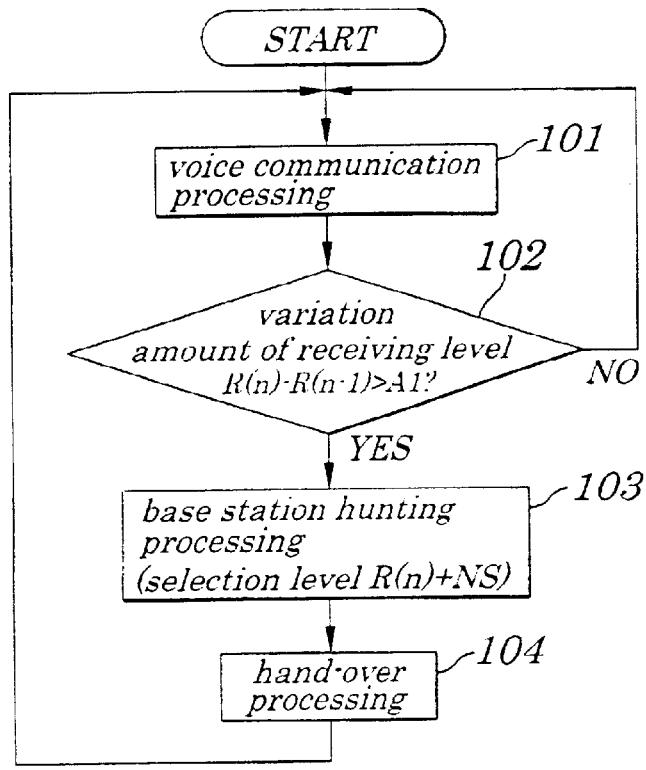
FIG. 1 is a flowchart showing a hand-over processing method according to a first embodiment of the present invention.
Figure 9:
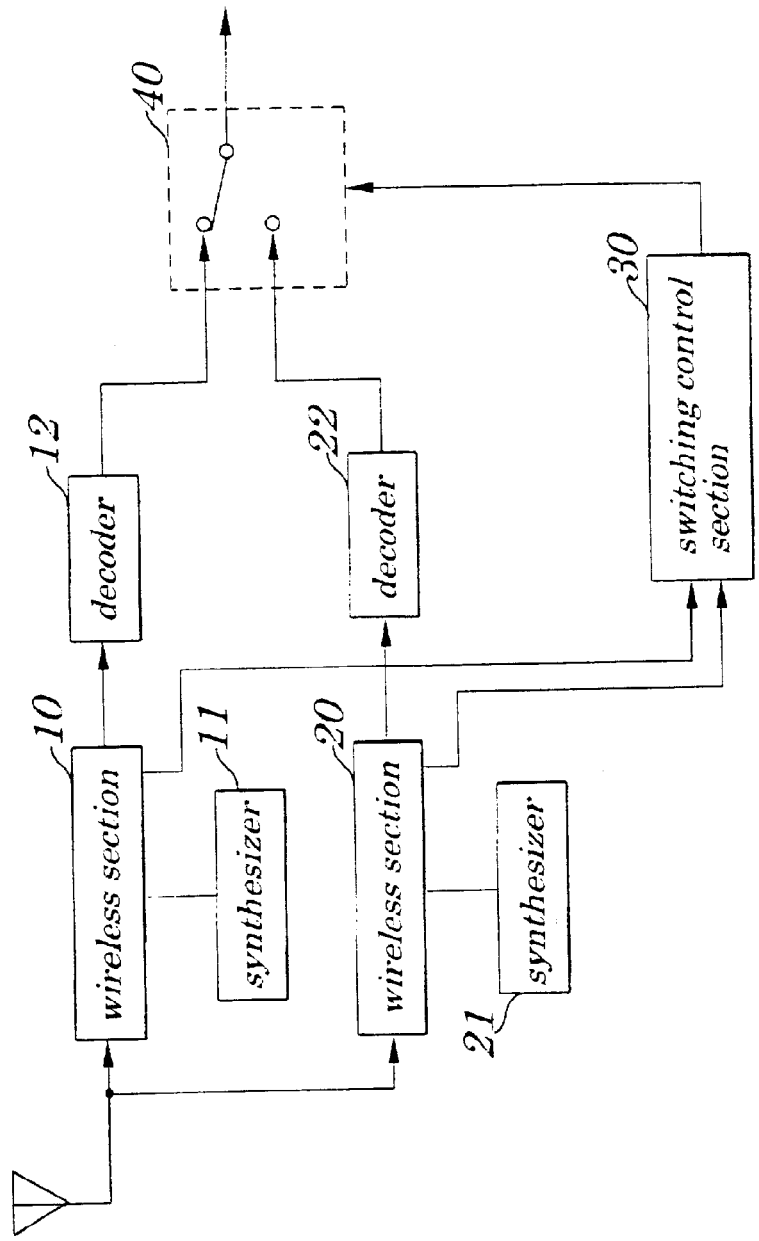
FIG. 9 is a schematic block diagram showing configurations of a conventional mobile terminal having two radio wave receiving sections.
Figure 10:
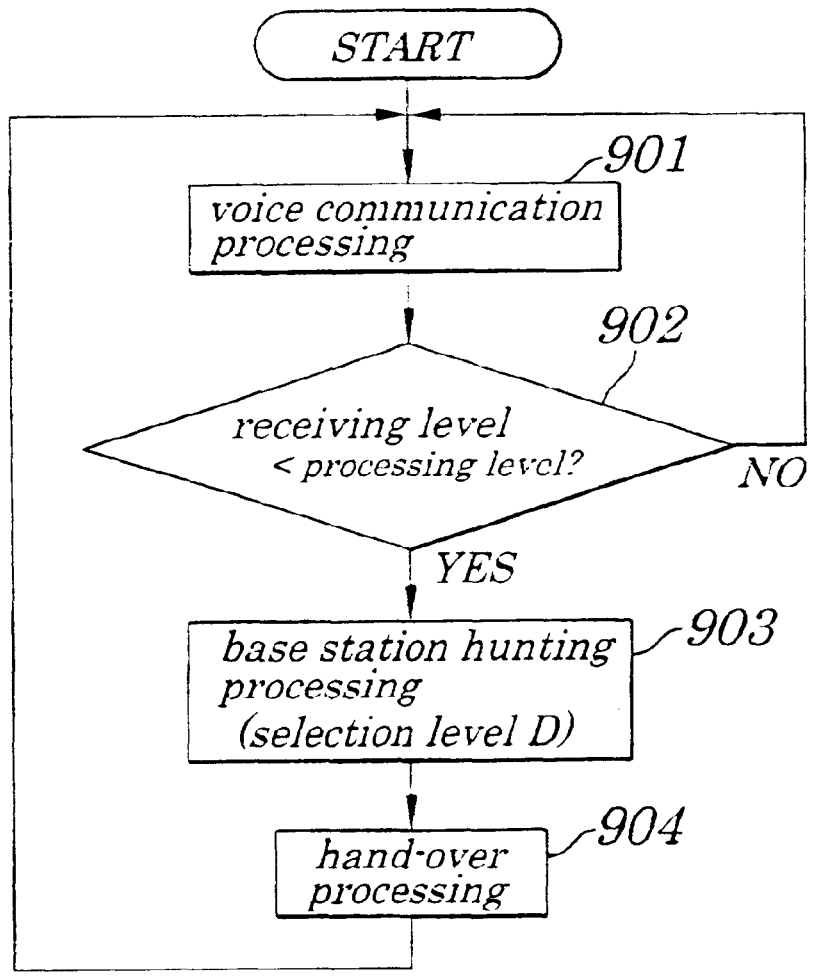
FIG. 10 is a flowchart showing the conventional hand-over processing method.

FIG. 1 is a flowchart showing a hand-over processing method according to a first embodiment of the present invention. Basic configurations of a mobile terminal of the first embodiment are almost the same as those shown in FIG. 9 except a method for hand-over processing to be performed by a switching control section 30.

Next, the method for the hand-over processing of the first embodiment is described by referring to FIG. 1. The mobile terminal of the first embodiment is measuring, at fixed intervals, a receiving level that a base station being presently operated for a telephone call provides. In the following description, the receiving level provided by the base station being presently operated for the telephone call measured n-th time is expressed as "R(n)". The mobile terminal is judging whether a variation amount of the receiving level R(n)−R(n−1) being a difference between the present receiving level R(n) and a receiving level R(n−1) measured last time is higher than a predetermined threshold value A1 or not.

The mobile terminal, if the variation amount of the receiving level R(n)−R(n−1) is not more than the predetermined threshold value A1, performs normal processing for speech (Step 101).

Figure 2:
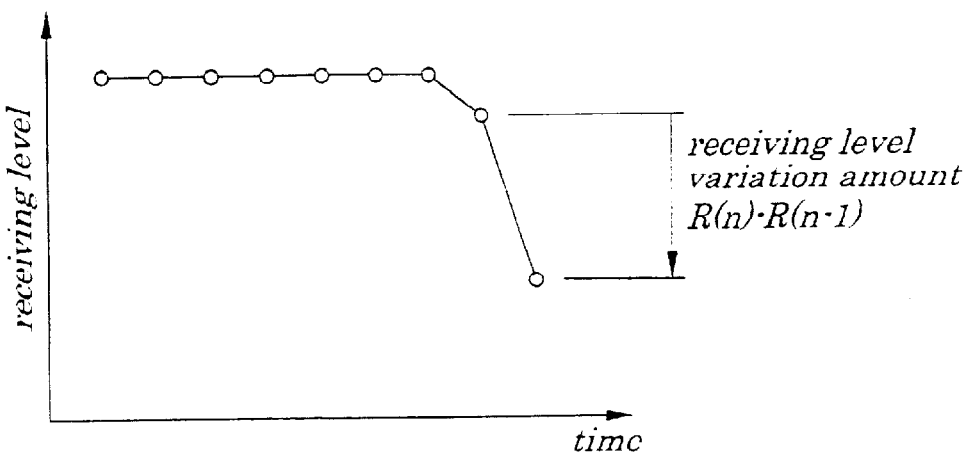
FIG. 2 is a diagram in which a receiving level R(n) provided by a base station being presently operated for a telephone call is plotted.

When the variation amount of the receiving level R(n)−R(n−1) is higher than the predetermined threshold value A1 (Step 102), the hand-over processing is started and base station hunting processing Lo hunt a base station to which the connection of the mobile terminal is to be handed over, is performed (Step 103). FIG. 2 is a diagram in which the receiving level R(n) provided by the base station being presently operated for the telephone call is plotted.

In the base station hunting processing, a level given by a receiving level "R(n)+NS" is used as the hand-over selection level. The "NS" is a fixed value being greater than "0". When the base station to which the connection of the mobile terminal is handed over is determined, the hand-over processing is performed (Step 104).

When the hand-over operation is terminated and the mobile terminal is put in a speech state, the mobile terminal resumes detection and measurement of the receiving level R(n) that the base station being presently operated is providing. In the hand-over processing method of the embodiment, when the mobile terminal is not moving, since there is hardly variation in the receiving level R(n), no hand-over processing is performed. If the mobile terminal is moving, since the variation in the receiving level occurs, the hand-over processing is started.

When a case of high speed movement of the mobile terminal is compared with a case of low speed movement of the mobile terminal, the variation in the receiving level provided by the base station being presently operated for the telephone call becomes larger in the case of the high speed movement of the mobile terminal. Therefore, in the first embodiment, by determining whether the hand-over processing is performed or not, based or the amount of variations in the receiving level provided by the base station being presently operated for the telephone call, the hand-over processing can be started easily in the case of the high-speed movement of the mobile terminal and further the hand-over processing with consideration given to the movement speed of the mobile terminal can be achieved.

In the hand-over processing method of the embodiment, a value that can satisfy "R(n)+NS" is used as the hand-over selection level used when the base station hunting is performed. The purpose of setting a difference between the receiving level provided by the base station being presently operated for the telephone call and the hand-over selection level by making the value of "NS" greater than "0" is to avoid needless and wasteful hand-over processing.

Figure 8:
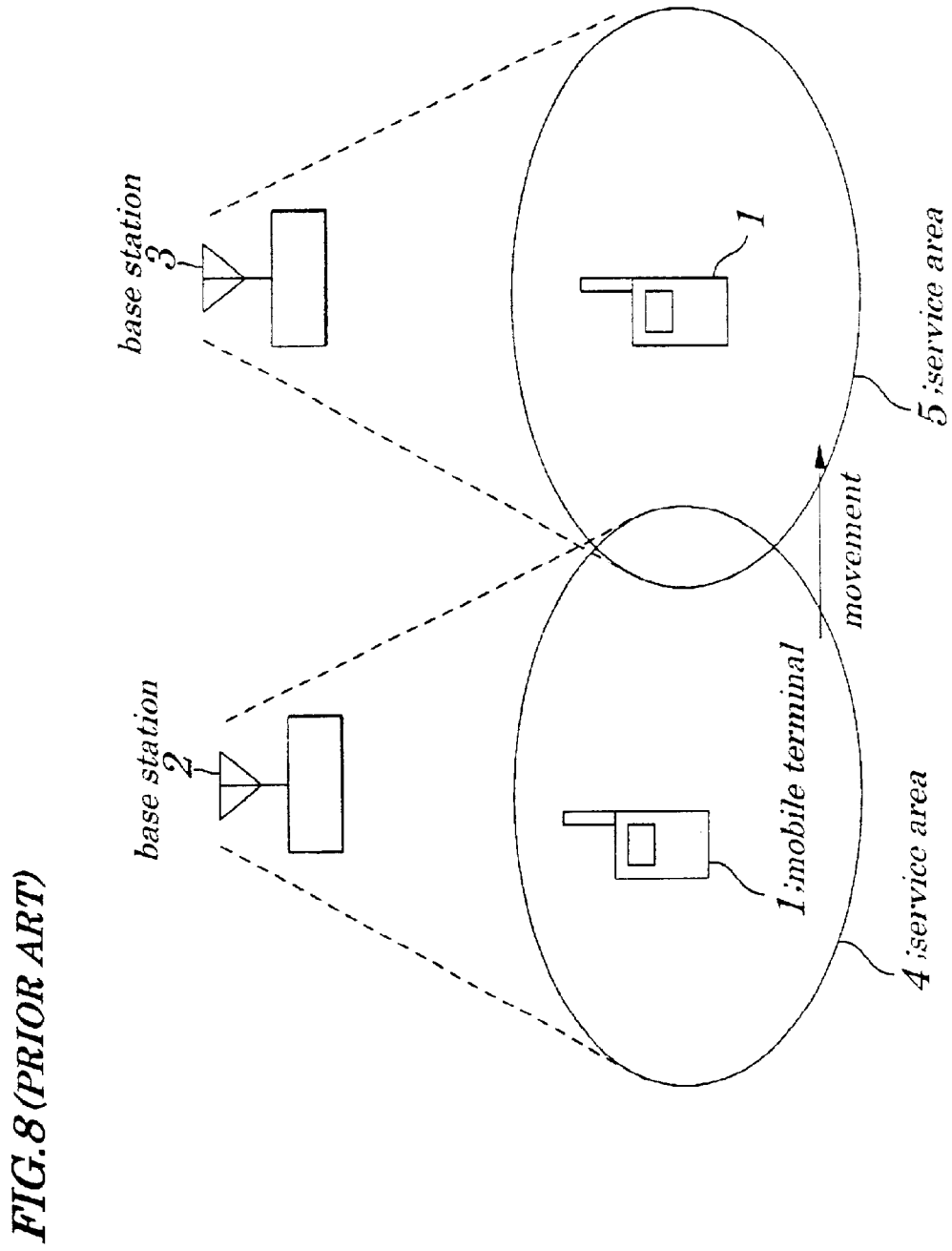
FIG. 8 is a diagram explaining conventional hand-over processing.

For example, if NS<0 (zero), in FIG. 8, when a mobile terminal 1 moves from a service area of a base station 2 to that of a base station 3, in a vicinity of boundaries of the service areas of base stations 2 and 3, connection of the mobile terminal 1 is handed over from the base station 2 to the base station 3 and, immediately after that, connection of the mobile terminal 1 is handed over from the base station 3 to the base station 2 and, as a result, switching of the connection of the mobile terminal 1 to the base station is done alternately and repeatedly between the base stations 2 and 3. Therefore, in the embodiment, by setting a difference of the value of "NS" between the receiving level provided by the base station being presently operated for the telephone call and the hand-over selection level, needless and wasteful hand-over processing can be reduced and power consumption can be lowered accordingly.

In the conventional hand-over processing method, since the hard-over selection level is set at a fixed value, only the base station that can provide a somewhat high receiving level can be a candidate for the base station to which the connection of the mobile terminal is handed over. Therefore, the base station that provides the receiving level being lower than the hand-over selection level can not be selected as the base station to which the connection of the mobile terminal is handed over. Even if the receiving level provided by the base station being presently operated for the telephone call and being the base station from which the connection of the mobile terminal is handed over is extremely low and even when the base station that provides the receiving level being higher than the receiving level provided by the base station being presently operated for the telephone voice communication exists, when the receiving level that the base station provides is lower than the hand-over selection level, the hand-over processing is not started. Because of this, in some cases, the needless base station hunting is carried out, causing the increase in the power consumption and, in spite of the case in which the hand-over processing has to be performed, no hand-over processing is started, thus causing degradation of speech quality.

In contrast, according to the embodiment, since the hand-over selection level is determined based on the receiving level R(n) provided by the base station being presently operated for the telephone voice communication, if the hand-over processing is started while the receiving level R(n) is comparatively low, the hand-over selection level used as a reference level for the base station hunting processing is also set at a low value and, therefore, the base station that provides a comparatively low receiving level can be selected as the base station to which the connection of the mobile terminal is handed over. This enables he hand-over processing to be started even in the above case, thus preventing degradation of speech quality. Moreover, needless base station hunting can be avoided, thus contributing to reduce power consumption.

Second Embodiment

Figure 3:
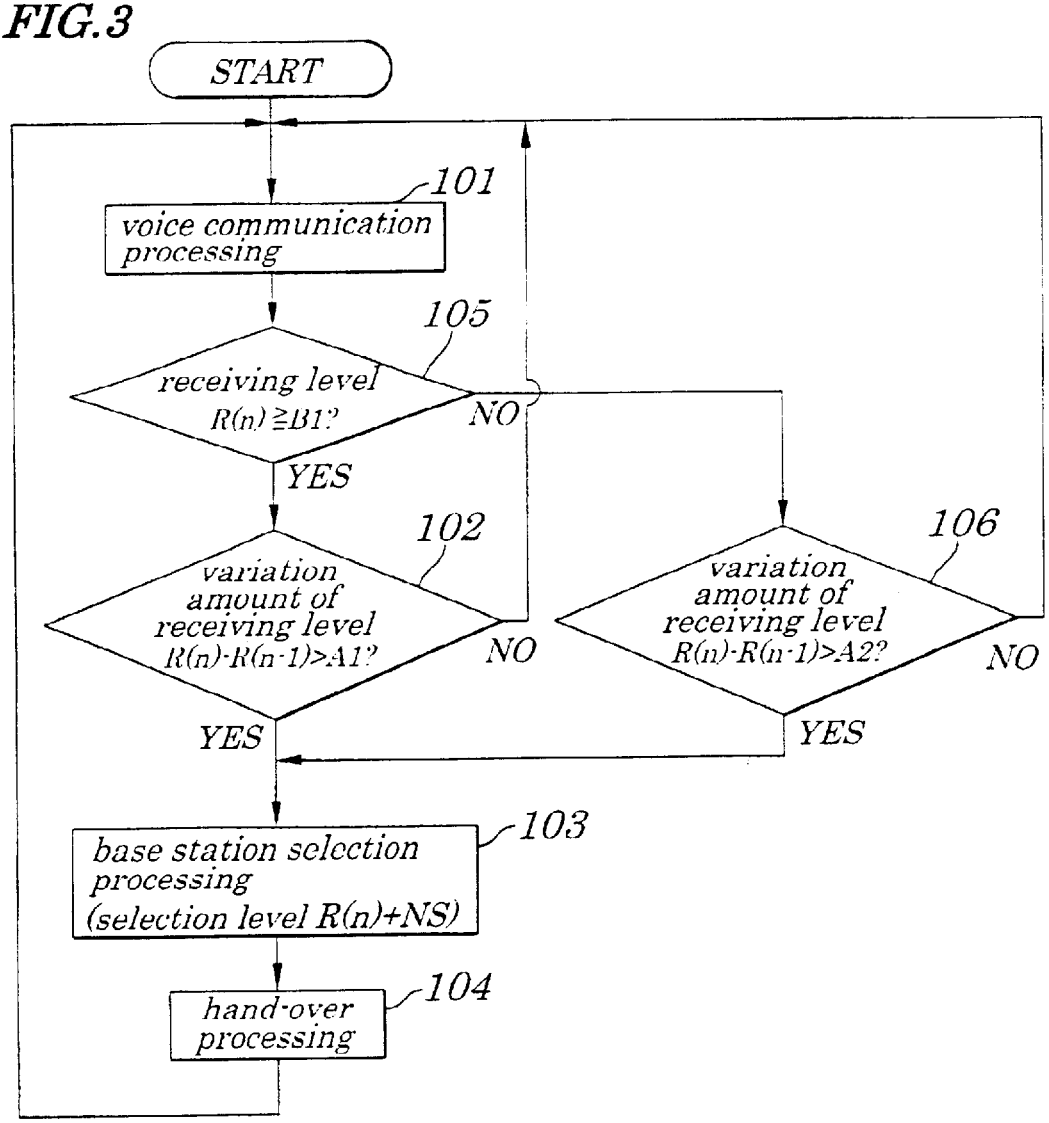
FIG. 3 is a flowchart explaining a method for a hand-over processing method according to a second embodiment of the present invention.

FIG. 3 is a flowchart explaining a method for hand-over processing according to a second embodiment of the present invention. The method for the hand-over processing of the second embodiment will be described below by referring to FIG. 3.

In the above first embodiment, as a variation amount of receiving level provided by a base station, being presently operated for telephone voice communication being a base station from which a connection of a mobile terminal is handed over, a difference between a receiving level R(n) and R(n−1) is used and a condition for starting base station hunting in the hand-over processing is set depending on whether the variation amount exceeds threshold value A1 or not. In the second embodiment, however, as the threshold value for the variation of the receiving level used to judge whether the hand-over processing is started or not, threshold values A1 and A2 are used, and the switching of the threshold values A1 and A2 is done depending on whether the receiving level R(n) is greater than the threshold value B1 or is less than threshold value B1. By employing this way, in this embodiment, the variation of the receiving level can be set depending on whether the receiving level is high or low.

The flowchart shown in FIG. 3 is the same as that in FIG. 1 except that Step 105 and Step 106 are added to the steps shown in FIG. 1. In the hand-over processing method of the second embodiment, whether the receiving level R(n) is higher than the threshold value B1 or not is first judged (Step 105) and, when the receiving level R(n) is higher than the threshold value B1, as in the case of the first embodiment, whether the hand-over processing is started or not is judged depending on whether the variation amount of the receiving level is higher than the threshold value A1 (Step 102) and, when the receiving level R(n) is less than the threshold value B1, whether the hand-over processing is started or not is judged depending on whether the variation amount of the receiving level is higher than the threshold value A2 (Step 106).

In ordinary cases, if the receiving level R(n) is high, since an electric field is at a sufficiently high level necessary to carry out communications, a larger value is set as the threshold value for the variation amount of the receiving level used for judging whether the hand-over processing is started or not and when the receiving level R(n) provided by the base station being presently operated for the telephone voice communication is somewhat low, a smaller value is set as the threshold value for the variation amount of the receiving level used for judging whether the hand-over processing is started or not. That is, in this embodiment, the threshold values are set so that A1>A2.

By setting as above, when the receiving level provided by the base station being presently operated for the telephone voice communication is high, by preventing the hand-over processing from being started indiscriminately or randomly, needless base station hunting car, be avoided without the degradation of radio wave receiving quality and, when the receiving level provided by the base station being presently operated for the telephone voice communication is low, the hand-over processing can be started easily and smoothly so as to prevent the degradation of the radio wave receiving quality.

Moreover, in this embodiment, as the threshold value to judge whether the receiving level is high or not, the threshold value B1 is used and as the threshold values for the variation amount of the receiving level to judge whether the hand-over processing is started or not, the two threshold values A1 and A2 are used. By increasing the number of such the threshold values, finer setting is made possible. For example, by using threshold values B1, B2, B3, . . . , $B_n$ as the threshold value to judge whether the receiving level is high or not and by using threshold values A1, A2, A3, . . . , $A_{n+1}$ as the threshold value for the variation amount of the receiving level to judge whether the hand-over processing is started or not, further finer setting is made possible.

Third Embodiment

Figure 4:
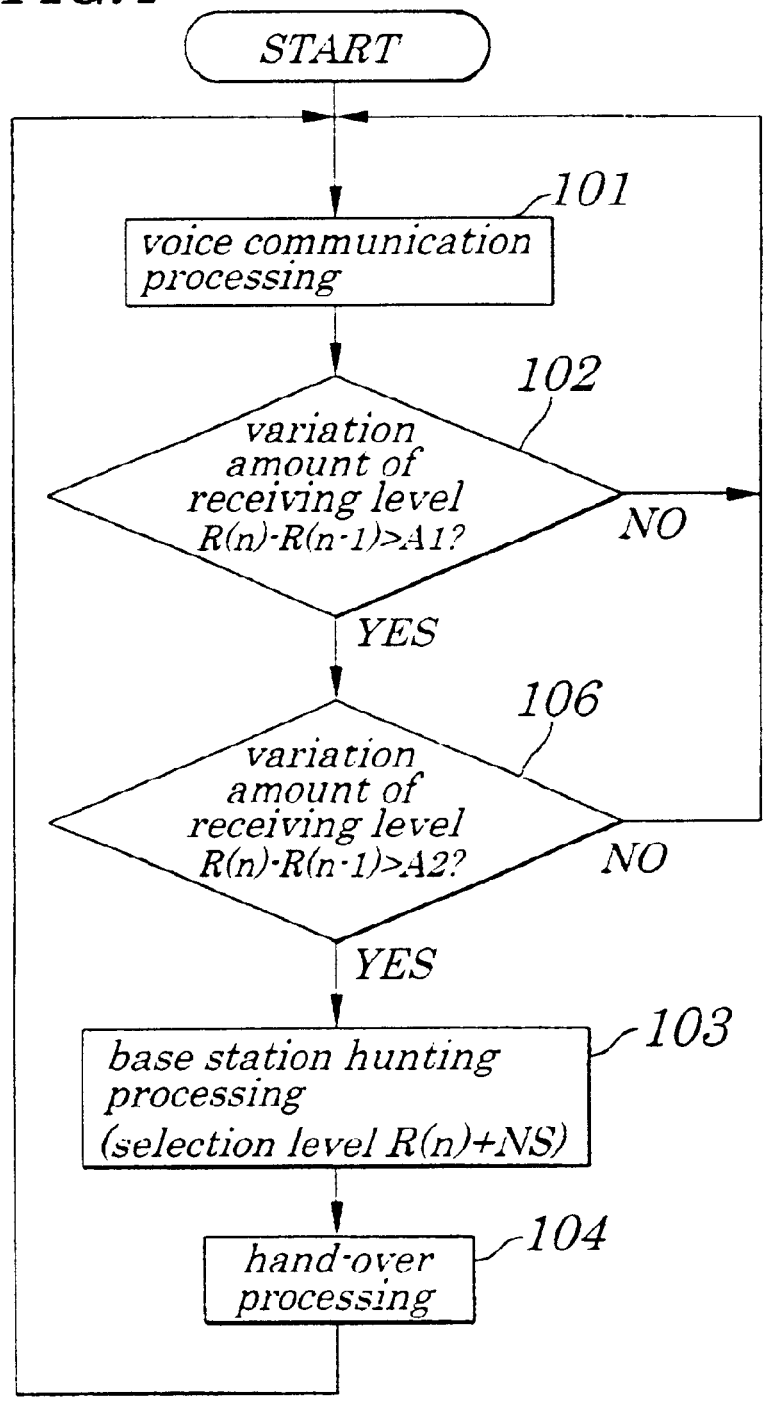
FIG. 4 is a flowchart explaining a method for hand-over processing according to a third embodiment of the present invention.

FIG. 4 is a flowchart explaining a method for hand-over processing according to a third embodiment of the present invention. The method for the hand-over processing of the third embodiment will be described below by referring to FIG. 4.

In the above first embodiment, a comparison between a variation amount of a receiving level R(n)−R(n−1) provided by a base station from which a connection of a mobile terminal is handed over and a threshold value A1 is performed only once, however, in this third embodiment, processing of the comparison is performed twice. In FIG. 4, Step 106 is newly added to the steps shown in FIG. 1. In this embodiment, even when the variation amount of receiving level R(n)−R(n−1) is judged to be greater than the threshold value A1 in Step 102, routine does not proceed directly to the hand-over processing but the processing in Step 106 is performed. In Step 106, the variation amount of the receiving level R(n)−R(n−1) is compared with threshold value A2 and if the variation amount of the receiving level R(n)−R(n−1) is judged to be greater than the threshold value A2, the hand-over processing is started.

At this point, the threshold values A1 and A2 may be the same or different from each other. In this embodiment, whether the hand-over processing is started or not is judged twice by using the two threshold values A1 and A2, however, the judgement may be carried out two or more times by using one or a plurality of threshold values. Thus, by performing several times' comparing processing, since the variation amount of the receiving level is averaged, the hand-over processing is not started simply because of instantaneous degradation in the receiving level and stable judgement as to whether the hand-over processing is started or not can be made.

To average the receiving level, as the variation amount of the receiving level, not the R(n)−R(n−1) but differences R(n)−R(n−2), R(n)−R(n−3), R(n)−R(n−4), . . . , R(n)−R(n−m) between the receiving level R(n) provided by the base station being presently operated for the telephone voice communication and receiving level R(n−m) of the radio wave received m-times before may be used.

Moreover, to average the receiving level, after the variation amount of the receiving level R(n)−R(n−1 ) is calculated two or more times, its resulting moving average may be calculated.

Fourth Embodiment

Figure 5:
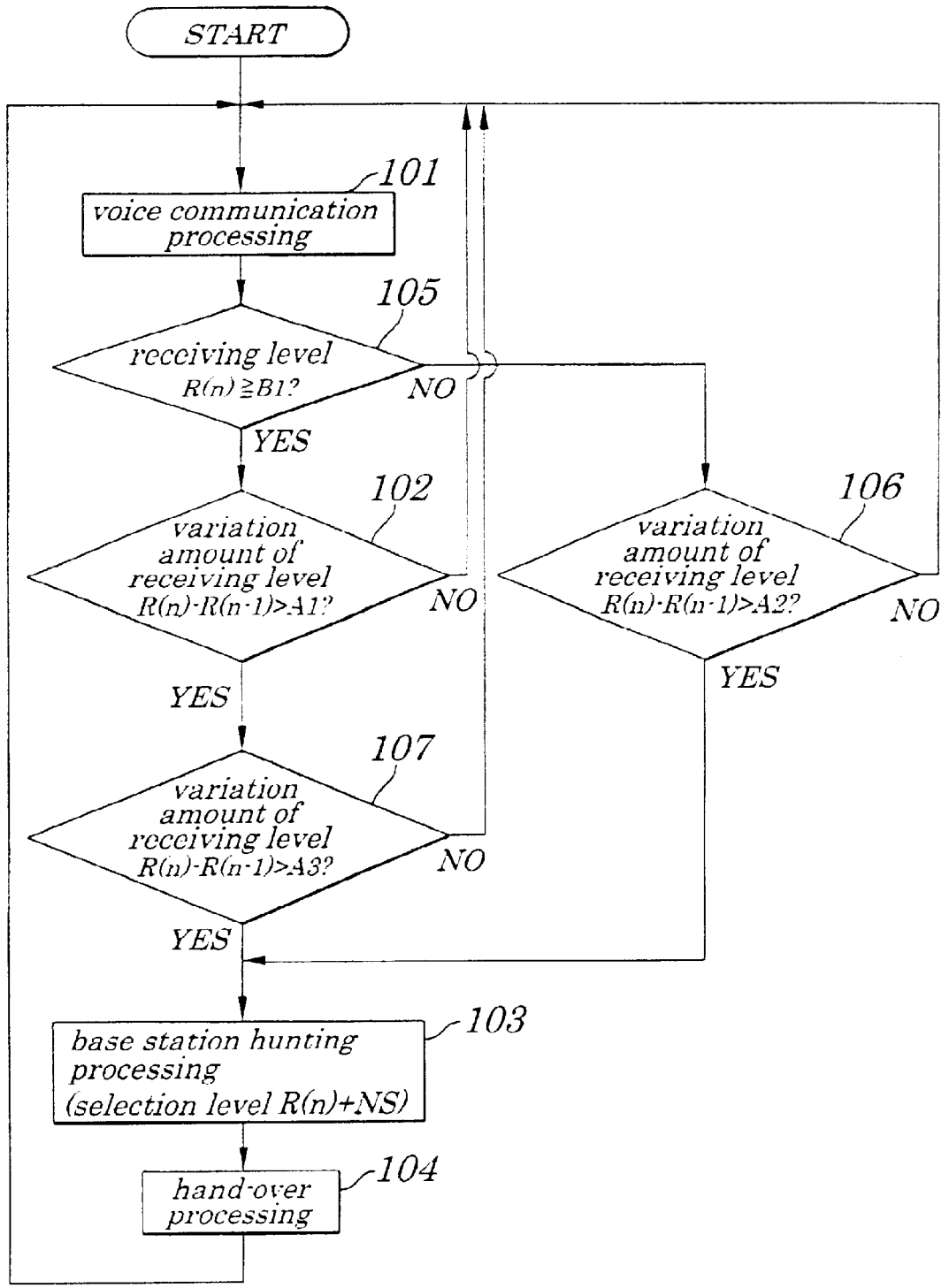
FIG. 5 is a flowchart explaining a method for hand-over processing according to a fourth embodiment of the present invention.

FIG. 5 is a flowchart explaining a method for hand-over processing according to a fourth embodiment of the present invention. The method for the hand-over processing of the fourth embodiment will be described below by referring to FIG. 5.

In the fourth embodiment, the number of times of comparison between a variation amount of a receiving level and a threshold value is changed depending on whether receiving level R(n) is high or not.

In the hand-over processing method of the fourth embodiment, as shown in FIG. 5, Step 107 is added to the steps shown in FIG. 3. As shown in FIG. 5, if the receiving level R(n) provided by a base station being presently operated for telephone voice communication is higher than threshold value B1 (Step 105), by comparing variation amount of receiving level R(n)−R(n−1) with threshold value A1 (Step 102) and by comparing the variation amount of the receiving level R(n)−R(n−1) with threshold value A3 (Step 107), judgment processing is performed twice. When the receiving level R(n) provided by the base station being presently operated for the telephone voice communication is less than the threshold value B1 (Step 105), the variation amount of the receiving level R(n)–R(n–1) is compared with threshold value A2 (Step 106).

In the embodiment, if the receiving level R(n) provided by the base station being presently, operated for the telephone voice communication is greaser than the threshold value B1, the comparison between the receiving variation level and the threshold value is performed twice and if the receiving revel R (n) provided by the base station being presently operated for the telephone voice communication is less than the threshold value B1, the comparison between the receiving variation level and the threshold value is performed only once. By employing such the method, when the receiving level R(n) is low, the hand-over processing can be easily started and when the receiving level R (n) is high, by preventing the hand-over processing from being started simply because of instantaneous degradation in the receiving level, stable judgement as to whether the hand-over processing is started or not can be made.

In this embodiment, as the threshold value to judge whether the receiving level is high or not, the threshold value B1 is used and as the threshold values for the variation amount of the receiving level to judge whether the hand-over processing is started or not, the three threshold values A1, A2, and A3 are used. By increasing the number of such the threshold values, further finer setting is made possible.

Fifth Embodiment

Figure 6:
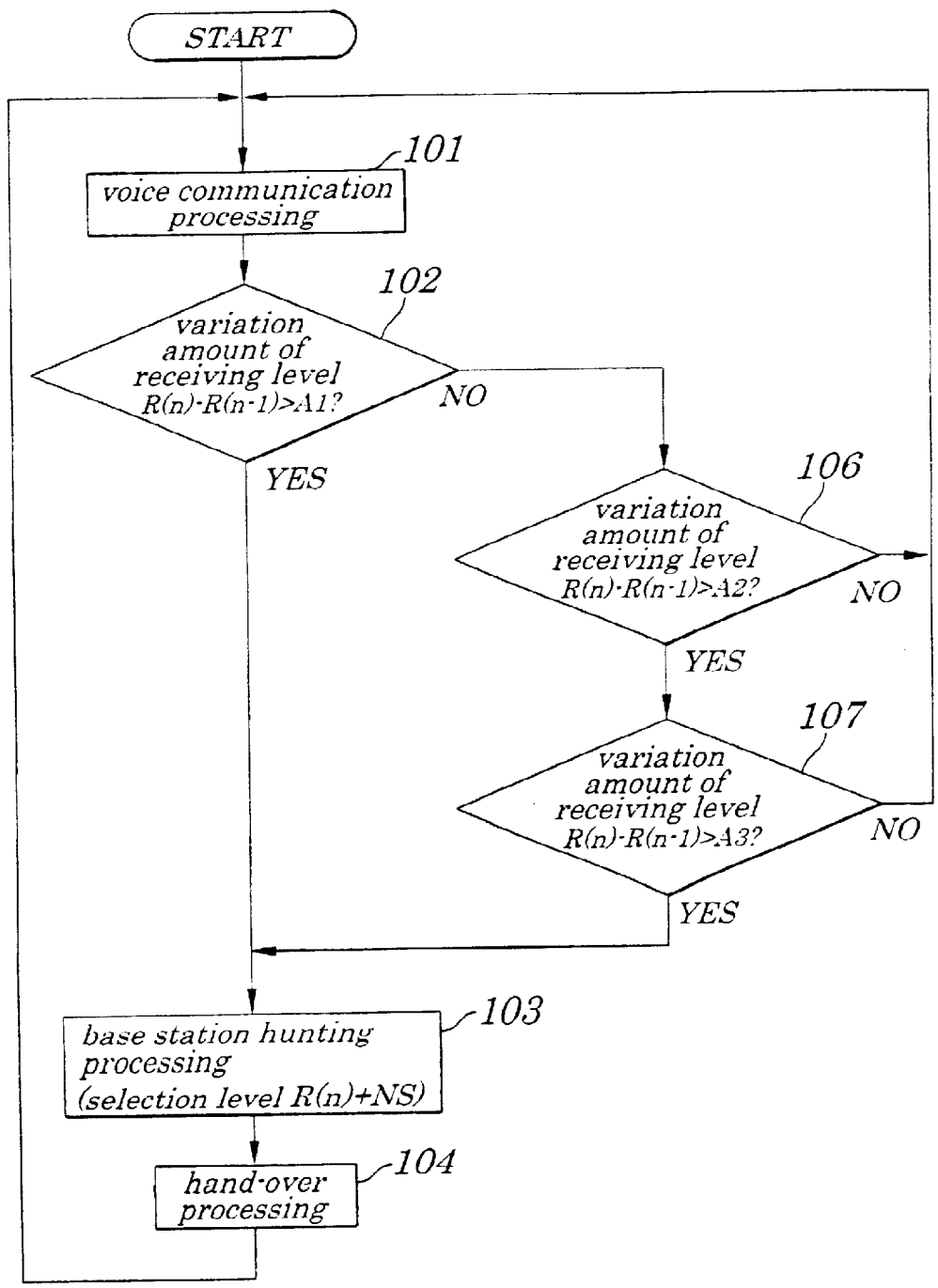
FIG. 6 is a flowchart explaining a method for hand-over processing according to a fifth embodiment of the present invention.

FIG. 6 is a flowchart explaining a method for hand-over processing according to a fifth embodiment of the present invention. The method for the hand-over processing of the fifth embodiment will be described by referring to FIG. 6 below.

The method for the hand-over processing of the fifth embodiment is a modified method of the third embodiment shown in FIG. 3. As shown in FIG. 6, Step 107 is added to the steps shown in FIG. 4.

In the hand-over processing method of the third embodiment, when a variation amount of a receiving level R(n)–R(n–1) is greater than a threshold value A1, base station hunting processing is performed following a first comparison processing in Step 102 and when the variation amount of the receiving level R(n)–R(n–1) is greater than a threshold value A2 and is less than the threshold value A1, the base station hunting processing is performed following two times' comparison processing in Steps 106 and 107.

By configuring as above, if the variations in the receiving level provided by, the base station being presently operated for telephone voice communication are large, the hand-over processing is started immediately followed by the base station hunting processing.

In this embodiment, as the threshold values for the variation amount of the receiving level to judge whether the hand-over processing is started or not, three threshold values A1, A2, and A3 are used. By increasing the number of such the threshold values, further finer setting is made possible.

Sixth Embodiment

Figure 7:
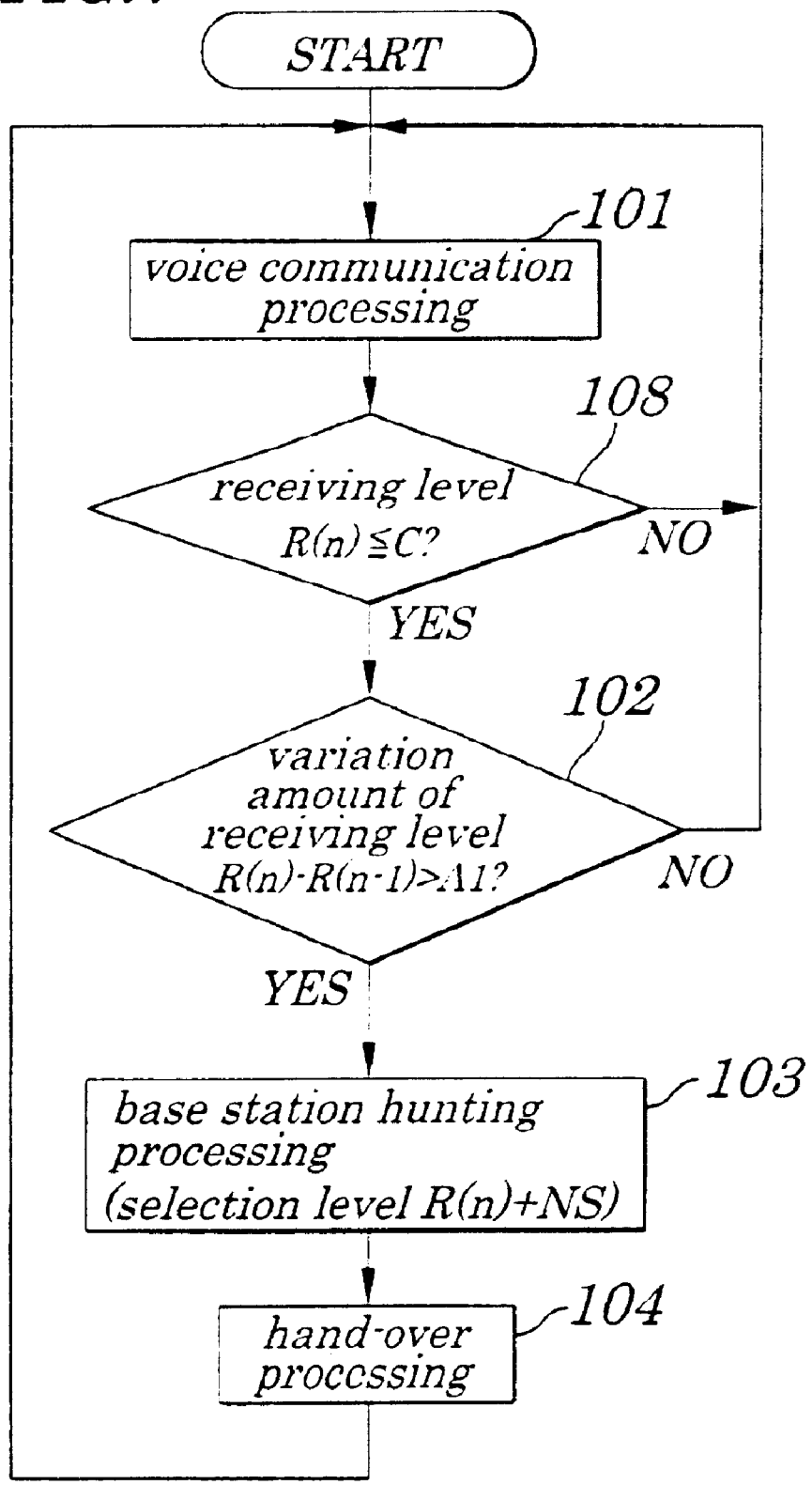
FIG. 7 is a flowchart explaining a method for hand-over processing according to a sixth embodiment of the present invention.

FIG. 7 is a flowchart explaining a method for hand-over processing according to a sixth embodiment of the present invention. The method for the hand-over processing of the sixth embodiment will be described below by referring to FIG. 7.

In the sixth embodiment, as shown in FIG. 7, Step 108 is added to steps in the first embodiment, in which, when a receiving level R(n) provided by a base station being presently operated for telephone voice communication is greater than a threshold value C and when an electric field is at a sufficiently high level, no processing of hunting the base station for the hand-over is performed.

Thus, according to the sixth embodiment, an effect can be obtained that, when the receiving level R(n) provided by the base station being presently operated for the telephone voice communication is maintained at a sufficient large value, even if the variations occur in the receiving level, since no hand-over processing is required, needless hand-over processing is not performed.

In this embodiment, the hand-over processing method is explained by using a case in which Step 108 is added to the steps in the first embodiment. However, the same effect as described above can be obtained by adding Step 108 to the processing steps provided in the second to fifth embodiments.

It is apparent that the present invention is not limited to the above embodiments but may be changed and modified without departing from the scope and spirit of the invention. For example, in the above embodiments, a difference between the present receiving level provided by the base station being operated for the telephone voice communication and the receiving level measured last time is calculated a plurality of times and a moving average is obtained and moving average is used as the variation amount of said receiving level. However, a difference between the receiving level provided by the base station being presently operated for the telephone voice communication and the receiving level measured specified number of times before may be used as the variation amount of the receiving level.

What is claimed is:

1. A hand-over processing method for performing hand-over processing in a mobile terminal capable of simultaneously receiving radio waves from two different base stations, said hand-over processing is to switch said base stations to which a line is connected for making a telephone voice communication, said method comprising:

a step of measuring, at fixed intervals, a receiving level provided by said base station being presently operated for said telephone voice communication;

a step of comparing a variation amount of a receiving level with a predetermined threshold value, said variation amount being indicative of a difference between a present receiving level and a receiving level measured last time provided by said base station being operated for said telephone voice communication;

a step of starting base station hunting processing to hunt a base station to which connection of said mobile terminal is to be handed over when said variation amount of said receiving level is judged to be greater than said threshold value;

a step of providing, in said base station hunting processing, a hand-over selection level by adding a predetermined value greater than 0 (zero) to said present receiving level; and a step of hunting, in said base station hunting processing, a base station whose receiving level is higher than said hand-over selection level as said base station to which connection of said mobile terminal is to be handed over.

2. A hand-over processing method according to claim 1, wherein a difference between said present receiving level provided by said base station being operated for said telephone voice communication and said receiving level measured last time is calculated a plurality of times to obtain a moving average and said moving average is used as said variation amount of a receiving level.

3. A hand-over processing method according to claim 1, further comprising a step of disabling said base station hunting when said present receiving level provided by said base station being operated for said telephone voice communication is higher than a predetermined level.

4. A hand-over processing method for performing hand-over processing in a mobile terminal capable of simultaneously receiving radio waves from two different base stations, said hand-over processing is to switch said base stations to which a line is connected for making a telephone voice communication, said method comprising:
- a step of comparing a receiving level with a predetermined value, said receiving level being provided by said base station being presently operated for said telephone voice communication;
- a step of measuring, at fixed intervals, said receiving level provided by said base station being presently operated for said telephone voice communication;
- a step of comparing, when a present receiving level provided by said base station being operated for said telephone voice communication is judged to be higher than a predetermined value, a variation amount of a receiving level with a predetermined first threshold value, said variation amount being indicative of a difference between said present receiving level and a receiving level measured last time;
- a step of starting base station hunting processing to hunt a base station to which connection of said mobile terminal is to be handed over when said variation amount of said receiving level is judged to be greater than said predetermined first threshold value;
- a step of comparing said variation amount of said receiving level with a second threshold value which is smaller than said predetermined first threshold value, when said receiving level provided by said base station being presently operated for said telephone voice communication is judged to be lower than said predetermined value;
- a step of starting base station hunting processing to hunt a base station to which connection of said mobile terminal is handed over when said variation amount of said receiving level is greater than said second threshold value;
- a step of providing, in said base station hunting processing, a hand-over selection level by adding a predetermined value greater than 0 (zero) to said present receiving level; and
- a step of hunting, in said base station hunting processing, a base station whose receiving level is higher than said hand-over selection level as said base station to which connection of said mobile terminal is to be handed over.

5. A hand-over processing method according to claim 4, wherein a difference between said present receiving level provided by said base station being operated for said telephone voice communication and said receiving level measured last time is calculated a plurality of times to obtain a moving average and said moving average is used as said variation amount of a receiving level.

6. A hand-over processing method according to claim 4, further comprising a step of disabling said base station hunting when said present receiving level provided by said base station being operated for said telephone voice communication is higher than a predetermined level.

7. A hand-over processing method for performing hand-over processing in a mobile terminal capable of simultaneously receiving radio waves from two different base stations, said hand-over processing is to switch said base stations to which a line is connected for making a telephone voice communication, said method comprising:
- a step of comparing a receiving level provided by said base station being presently operated for said telephone voice communication with a plurality of predetermined values;
- a step of measuring, at fixed intervals, said receiving level provided by said base station being presently operated for said telephone voice communication;
- a step of comparing a variation amount of a receiving level with a threshold value, said variation amount being indicative of a difference between a present receiving level and a receiving level measured last time provided by said base station being operated for said telephone voice communication and said threshold value is determined by comparison between said present receiving level provided by said base station being operated for said telephone voice communication and said plurality of predetermined values;
- a step of starting base station hunting processing to hunt a base station to which connection of said mobile terminal is to be handed over when said variation amount of said receiving level is judged to be greater than said threshold value;
- a step of providing, in said base station hurting processing, a hand-over selection level by adding a predetermined value greater than 0 (zero) to said present receiving level; and
- a step of hunting, in said base station hunting processing, a base station whose receiving level is higher than said hand-over selection level as said base station to which connection of said mobile terminal is to be handed over.

8. A hand-over processing method according to claim 7, wherein a difference between said present receiving level provided by said base station being operated for said telephone voice communication and said receiving level measured last time is calculated a plurality of times to obtain a moving average and said moving average is used as said variation amount of a receiving level.

9. A hand-over processing method according to claim 7, further comprising a step of disabling said base station hunting when said present receiving level provided by said base station being operated for said telephone voice communication is higher than a predetermined level.

10. A hand-over processing method for performing hand-over processing in a mobile terminal capable of simultaneously receiving radio waves from two different base stations, said hand-over processing is to switch said base stations to which a line is connected for making a telephone voice communication, said method comprising:
- a step of measuring, at fixed intervals, a receiving level provided by said base station being presently operated for said telephone voice communication;
- a step of comparing a variation amount of a receiving level with a predetermined first threshold value, said variation amount being indicative of a difference between a present receiving level and a receiving level measured last time provided by said base station being operated for said telephone voice communication;
- a step of comparing said variation amount of said receiving level with a predetermined second threshold value when said variation amount of said receiving level is judged to be greater than said first threshold value;
- a step of starting base station hunting processing to hunt a base station to which connection of said mobile terminal is handed over when said variation amount of said receiving level is judged to be greater than said predetermined second threshold value;

a step of providing, in said base station hunting processing, a hand-over selection level by adding a predetermined value greater than 0 (zero) to said present receiving level; and a step of hunting, in said base station hunting processing, a base station whose receiving level is higher than said hand-over selection level as said base station to which connection of said mobile terminal is to be handed over.

11. A hand-over processing method according to claim 10, wherein a difference between said present receiving level provided by said base station being operated for said telephone voice communication and said receiving level measured last time is calculated a plurality of times to obtain a moving average and said moving average is used as said variation amount of a receiving level.

12. A hand-over processing method according to claim 10, further comprising a step of disabling said base station hunting when said present receiving level provided by said base station being operated for said telephone voice communication is higher than a predetermined level.

13. A hand-over processing method for performing hand-over processing in a mobile terminal capable of simultaneously receiving radio waves from two different base stations, said hand-over processing is to switch said base stations to which a line is connected for making a telephone voice communication, said method comprising:

a step of measuring, at fixed intervals, a receiving level provided by said base station being presently operated for said telephone voice communication;

a step of comparing a variation amount of a receiving level with a plurality of predetermined threshold values, said variation amount being indicative of a difference between a present receiving level and a receiving level measured last time provided by said base station being operated for said telephone voice communication;

a step of starting base station hunting processing to hunt a base station to which connection of said mobile terminal is handed over when said variation amount of said receiving level is judged to be greater than all of said threshold values being subjected to said comparison;

a step of providing, in said base station hunting processing, a hand-over selection level by adding a predetermined value greater than 0 (zero) to said present receiving level; and a step of hunting, in said base station hunting processing, a base station whose receiving level is higher than said hand-over selection level as said base station to which connection of said mobile terminal is to be handed over.

14. A hand-over processing method according to claim 13, wherein a difference between said present receiving level provided by said base station being operated for said telephone voice communication and said receiving level measured last time is calculated a plurality of times to obtain a moving average and said moving average is used as said variation amount of a receiving level.

15. A hand-over processing method according to claim 13, further comprising a step of disabling said base station hunting when said present receiving level provided by said base station being operated for said telephone voice communication is higher than a predetermined level.

16. A hand-over processing method for performing hand-over processing in a mobile terminal capable of simultaneously receiving radio waves from two different base stations, said hand-over processing is to switch said base stations to which a line is connected for making a telephone voice communication, said method comprising:

a step of measuring, at fixed intervals, a receiving level provided by said base station being presently operated for said telephone voice communication;

a step of comparing a variation amount of a receiving level with a predetermined first threshold value, said variation amount being indicative of a difference between a present receiving level and a receiving level measured a predetermined number of times before the last provided by said base station being operated for said telephone voice communication;

a step of comparing said variation amount of said receiving level with a predetermined second threshold value when said variation amount of said receiving level is judged to be greater than said first threshold value;

a step of starting base station hunting processing to hunt a base station to which connection of said mobile terminal is handed over when said variation amount of said receiving level is judged to be greater than said predetermined second threshold value;

a step of providing, in said base station hunting processing, a hand-over selection level by adding a predetermined value greater than 0 (zero) to said present receiving level; and a step of hunting, in said base station hunting processing, a base station whose receiving level is higher than said hand-over selection level as said base station to which connection of said mobile terminal is to be handed over.

17. A hand-over processing method according to claim 16, further comprising a step of disabling said base station hunting when said present receiving level provided by said base station being operated for said telephone voice communication is higher than a predetermined level.

18. A hand-over processing method for performing hand-over processing in a mobile terminal capable of simultaneously receiving radio waves from two different base stations, said hand-over processing is to switch said base stations to which a line is connected for making a telephone voice communication, said method comprising:

a step of comparing a receiving level with a predetermined value, said receiving level being provided by said base station being presently operated for said telephone voice communication;

a step of measuring, at fixed intervals, said receiving level provided by said base station being presently operated for said telephone voice communication;

a step of comparing, when a present receiving level provided by said base station being operated for said telephone voice communication is judged to be higher than a predetermined value, a variation amount of a receiving level with a predetermined first threshold value, said variation amount being indicative of a difference between said present receiving level and a receiving level measured last time;

a step of comparing said variation amount of said receiving level with a predetermined second threshold value when said variation amount of said receiving level is judged to be greater than said first threshold value;

a step of starting base station hunting processing to hunt a base station to which connection of said mobile terminal is handed over when said variation amount of said receiving level is judged to be greater than said predetermined second threshold value;

a step of comparing said variation amount or said receiving level with a third threshold value which is smaller than said predetermined first threshold value, when said receiving level provided by said base station being presently operated for said telephone voice communication is judged to be lower than said predetermined value;

a step of starting base station hunting processing to hunt a base station to which connection of said mobile terminal is handed over when said variation amount of said receiving level is greater than said third threshold value;

a step of providing, in said base station hunting processing, a hand-over selection level by adding a predetermined value greater than 0 (zero) to said present receiving level; and a step of hunting, in said base station hunting processing, a base station whose receiving level is higher than said hand-over selection level as said base station to which connection of said mobile terminal is to be handed over.

19. A hand-over processing method according to claim 18, further comprising a step of disabling said base station hunting when said present receiving level provided by said base station being operated for said telephone voice communication is higher than a predetermined level.

20. A hand-over processing method for performing hand-over processing in a mobile terminal capable of simultaneously receiving radio waves from two different base stations, said hand-over processing is to switch said base stations to which a line is connected for making a telephone voice communication, said method comprising:

a step of comparing a receiving level provided by said base station being presently operated for said telephone voice communication with a plurality of predetermined values;

a step of measuring, at fixed intervals, said receiving level provided by said base station being presently operated for said telephone voice communication;

a step of comparing a variation amount of a receiving level with one or a plurality of threshold values, said variation amount being indicative of a difference between a present receiving level and a receiving level measured last time provided by said base station being operated for said telephone voice communication and said threshold value is determined by comparison between said present receiving level provided by said base station being operated for said telephone voice communication and said plurality of predetermined values;

a step of starting base station hunting processing to hunt a base station to which connection of said mobile terminal is to be handed over when said variation amount of said receiving level is judged to be greater than said one or said plurality of threshold values;

a step of providing, in said base station hunting processing, a hand-over selection level by adding a predetermined value greater than 0 (zero) to said present receiving level; and a step of hunting, in said base station hunting processing, a base station whose receiving level is higher than said hand-over selection level as said base station to which connection of said mobile terminal is to be handed over.

21. A hand-over processing method according to claim 20, further comprising a step of disabling said base station hunting when said present receiving level provided by said base station being operated for said telephone voice communication is higher than a predetermined level.

22. A hand-over processing method for performing hand-over processing in a mobile terminal capable of simultaneously receiving radio waves from two different base stations, said hand-over processing is to switch said base stations to which a line is connected for making a telephone voice communication, said method comprising:

a step of measuring, at fixed intervals, a receiving level provided by said base station being presently operated for said telephone voice communication;

a step of comparing a variation amount of a receiving level with a predetermined first threshold value, said variation amount being indicative of a difference between a present receiving level and a receiving level measured last time provided by said base station being operated for said telephone voice communication;

a step of starting base station hunting processing to hunt a base station to which connection of said mobile terminal is handed over when said variation amount of said receiving level is judged to be greater than said predetermined first threshold value;

a step of comparing said variation amount of said receiving level with a predetermined second threshold value when said variation amount of said receiving level is judged to be lower than said first threshold value;

a step of comparing said variation amount of said receiving level with a predetermined third threshold value when said variation amount of said receiving level is judged to be lower than said second threshold value;

a step of starting base station hunting processing to hunt a base station to which connection of said mobile terminal is handed over when said variation amount of said receiving level is judged to be greater than said third threshold value;

a step of providing, in said base station hunting processing, a hand-over selection level by adding a predetermined value greater than 0 (zero) to said present receiving level; and a step of hunting, in said base station hunting processing, a base station whose receiving level is higher than said hand-over selection level as said base station to which connection of said mobile terminal is to be handed over.

23. A hand-over processing method according to claim 22, further comprising a step of disabling said base station hunting when said present receiving lever provided by said base station being operated for said telephone voice communication is higher than a predetermined level.

24. A hand-over processing method for performing hand-over processing in a mobile terminal capable of simultaneously receiving radio waves from two different base stations, said hand-over processing is to switch said base stations to which a line is connected for making a telephone voice communication, said method comprising:

a step of measuring, at fixed intervals, a receiving level provided by said base station being presently operated for said telephone voice communication;

a step of comparing a variation amount of a receiving level with a predetermined first threshold value, said variation amount being indicative of a difference between a present receiving level and a receiving level measured last time provided by said base station being operated for said telephone voice communication;

a step of starting base station hunting processing to hunt a base station to which connection of said mobile terminal is handed over when said variation amount of said receiving level is judged to be greater than said predetermined first threshold value;

a step of comparing said variation amount of said receiving level with a predetermined plurality of second threshold values when said variation amount of said receiving level is judged to be lower than said first threshold value;

a step of starting base station hunting processing to hunt a base station to which connection of said mobile terminal is to be handed over when said variation amount of said receiving level is judged to be smaller than all of said plurality of second threshold values;

a step of providing, in said base station hunting processing, a hand-over selection level by adding a predetermined value greater than 0 (zero) to said present receiving level; and a step of hunting, in said base station hunting processing, a base station whose receiving level is higher than said hand-over selection level as said base station to which connection of said mobile terminal is to be handed over.

25. A hand-over processing method according to claim 24, further comprising a step of disabling said base station hunting when said present receiving level provided by said base station being operated for said telephone voice communication is higher than a predetermined level.

* * * * *